(12) United States Patent
Liu et al.

(10) Patent No.: US 8,159,975 B2
(45) Date of Patent: Apr. 17, 2012

(54) SELF-CONFIGURED NETWORK SYSTEM AND SELF-CONFIGURATION METHOD OF SAME

(75) Inventors: Chun-Yu Liu, Hsinchu (TW);
Jui-Chang Chen, Hsinchu (TW);
Chih-Chung Lin, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 305 days.

(21) Appl. No.: 12/476,792

(22) Filed: Jun. 2, 2009

(65) Prior Publication Data
US 2009/0323556 A1    Dec. 31, 2009

(30) Foreign Application Priority Data

Jun. 25, 2008  (TW) ............................... 97123785 A (51) Int. Cl.
*H04L 12/28* (2006.01)
(52) U.S. Cl. ........ 370/255; 370/343; 370/392; 370/400; 709/245; 709/223; 709/224
(58) Field of Classification Search .................. 370/238, 370/343, 401; 375/240.01; 709/238, 245
See application file for complete search history.

(56) References Cited

U.S. PATENT DOCUMENTS

| | | | |
|---|---|---|---|
| 7,337,910 B2* | 3/2008 | Cartmell et al. | 209/245 |
| 7,720,997 B1* | 5/2010 | Gourlay et al. | 709/245 |
| 2004/0246936 A1* | 12/2004 | Perlman | 370/343 |
| 2006/0126613 A1 | 6/2006 | Zweig | |
| 2006/0250976 A1 | 11/2006 | Wing et al. | |
| 2007/0055761 A1* | 3/2007 | De Graaff | 709/223 |
| 2008/0247457 A1* | 10/2008 | Cromwell et al. | 375/240.01 |

FOREIGN PATENT DOCUMENTS

CN    101098284    1/2008

OTHER PUBLICATIONS

Taiwan Patent Office Search Report issued on Feb. 8, 2012.
Taiwan Patent Office OA Communication issued on Feb. 8, 2012.

* cited by examiner

*Primary Examiner* — Robert Wilson
*Assistant Examiner* — Mohamed Kamara
(74) *Attorney, Agent, or Firm* — WPAT., P.C.; Justin King (57) ABSTRACT

A self-configured network system includes a server including a plurality of columns. Each column records therein correlation of a domain name to a corresponding network addressing information. An internet protocol device is built therein a preset domain name and acquires an updated network addressing information in the internet. The preset domain name is previously recorded in a specified column of the server. The internet protocol device transfers the preset domain name and the updated network addressing information to the server via the internet so as to locate the specified column and replace the corresponding network addressing information with the updated network addressing information. A user's node is capable of linking to the internet and accessible to the server to acquire the updated network addressing information of the internet protocol device via the internet in response to input of the preset domain name.

18 Claims, 4 Drawing Sheets

SELF-CONFIGURED NETWORK SYSTEM AND SELF-CONFIGURATION METHOD OF SAME

FIELD OF THE INVENTION

The present invention relates to a self-configured network system and a self-configuration method of a network system, and more particularly to a self-configured network system and a self-configuration method of a network system for obtaining network addressing information of an internet protocol device. The present invention also relates to an internet protocol device accessible by a user's node via an internet.

BACKGROUND OF THE INVENTION

Nowadays, Internet has become more and more essential to people's lives. Therefore, a variety of Internet-associated products and improvements have been developed and made to make use of Internet in an easy and efficient way.

Figure 1:
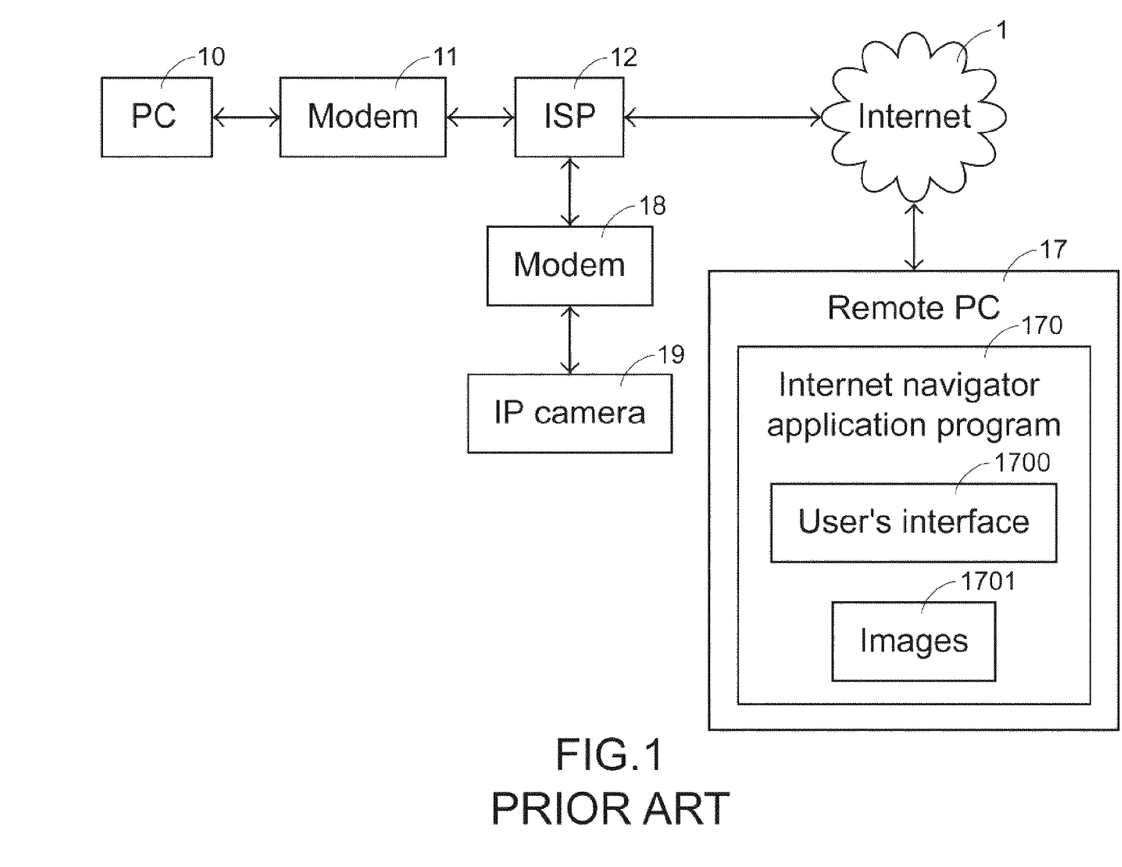
FIG. 1 is a structural block diagram illustrating a network system interconnected based on point-to-point link of Ethernet according to prior art.

Please refer to FIG. 1, which illustrates a network system performed with interconnection via Point-to-Point Protocol over Internet (PPPoE). As shown, a personal computer (PC) 10 is connected to a modem 11 and capable of logging in an Internet Service Provider (ISP) 12 via the modem 11 to acquire an Internet Protocol (IP) address. With the IP address in the Internet 1, the PC 10 may carry out a variety of actions within the Internet.

For example, an IP camera is one of the outstanding applications. The IP camera 19, for example disposed at the user's home, is capable of logging in the ISP 12 to obtain its own IP address. Then the user may utilize a remote PC 17, for example disposed in the user's office, to see the images 1701 picked up by the IP camera 19. What the user needs to do is to execute an Internet navigator application program 170 in the PC 17 and enter the IP address acquired from the ISP 12 via a user's interface 1700 provided by the Internet navigator application program 170.

In the prior art, the IP camera 19 has to acquire an IP address from the ISP 12 and the user has to memorize the IP address for input to correspond to the IP camera 19. However, it is costly to apply for a user's account for the IP camera 19. A further problem may occur particularly when the IP address is not exclusive but floating, i.e. dynamic IP. It is because the IP address will be different for each log-in action.

SUMMARY OF THE INVENTION

Therefore, the present invention provides a self-configuration method for the network system to obtain the network addressing information of the IP camera no matter if the IP camera has a static or dynamic IP address.

The present invention provides a self-configured network system. The system includes a server capable of linking to an internet and including a plurality of columns, each of which records therein correlation of a domain name to a corresponding network addressing information; an internet protocol device built therein a preset domain name and acquiring an updated network addressing information in the internet, wherein the preset domain name is previously recorded in a specified column of the server, and the internet protocol device transfers the preset domain name and the updated network addressing information to the server via the internet so as to locate the specified column and write the updated network addressing information as the corresponding network addressing information; and a user's node capable of linking to the internet and accessible to the server to acquire the updated network addressing information of the internet protocol device via the internet in response to input of the preset domain name.

In an embodiment, the updated network addressing information is an updated Internet Protocol (IP) address and the internet protocol device acquires the updated network addressing information from an Internet Service Provider (ISP), and wherein the server is a Dynamic Domain Name Server (DDNS) installed therein a domain-name—IP-address correlation table including the specified column recording therein the preset domain name and the updated IP address.

In another embodiment, the self-configured network system according to claim 1 further comprising a Network Address Transfer (NAT) device acquiring a public Internet Protocol (IP) address from an Internet Service Provider (ISP) so that the internet protocol device links to the internet via the NAT device with the public IP address, wherein the internet protocol device dynamically acquires a private IP address from the NAT device and generates an internal service port number specific thereto. In this embodiment, the server is preferably an enhanced Dynamic Domain Name Server (enhanced DDNS) installed therein a domain-name—network-addressing-information correlation table including the specified column recording therein the preset domain name and the updated network addressing information. The network addressing information incorporates therein the public IP address and an external service port number, wherein the external service port number is generated by the NAT device and notified of port creation by internet protocol device and a correlation among the public IP address, the external service port number, the private IP address and the internal service port number is recorded in the NAT device.

The present invention also provides a self-configuration method of a network system for allowing a user's node to access an internet protocol device via an internet. The method includes providing a preset domain name built in the internet protocol device for the internet protocol device to acquire an updated network addressing information in the internet; providing a correlation table built in a server, the correlation table including a plurality of columns, each of which records therein correlation of a domain name to a corresponding network addressing information and a specified one of which stores the preset domain name and a preset network addressing information corresponding to the preset domain name; and linking the internet protocol device to the internet and transferring the preset domain name and the updated network addressing information from the internet protocol device to the server via the internet so as to locate the specified column and write the updated network addressing information as the preset network addressing information. According to the invention, the user's node, after linking to the internet, accesses to the server to acquire the updated network addressing information of the internet protocol device via the internet in response to input of the preset domain name to link to the internet protocol device according to the updated network addressing information.

In an embodiment, the updated network addressing information is an Internet Protocol (IP) address and the internet protocol device acquires the updated network addressing information from an Internet Service Provider (ISP).

In another embodiment, the method further includes: connecting the internet protocol device to a Network Address Transfer (NAT) device which acquires a public Internet Protocol (IP) address from an Internet Service Provider (ISP) so that the internet protocol device links to the internet via the NAT device with the public IP address; dynamically distributing a private IP address from the NAT device to the internet protocol device; generating an internal service port number and notifying the NAT device of an external service port number creation by the internet protocol device; generating an external service port number by the NAT device; recording a correlation among the public IP address, the external service port number, the private IP address and the internal service port number in the NAT device; and recording a network addressing information incorporating therein the public IP address and the external service port number in the specified column of the server as the updated network addressing information.

The present invention further provides an internet protocol device accessible by a user's node via an internet. The internet protocol device includes a memory unit storing therein a preset domain name specific to the internet protocol device; a networking module for linking the internet protocol device to the internet, acquiring an updated network addressing information in the internet according to the preset domain name; and a control unit coupled to the memory unit and the networking module and transferring the preset domain name and the updated network addressing information to a server via the internet so as to locate a specified column corresponding to the preset domain name in the server and write the updated network addressing information into the specified column. According to the invention, the user's node, after linking to the internet, accesses to the server to acquire the updated network addressing information of the internet protocol device via the internet in response to input of the preset domain name so as to link to the internet protocol device according to the updated network addressing information.

In an embodiment, the updated network addressing information is an updated Internet Protocol (IP) address and the internet protocol device acquires the updated network addressing information from an Internet Service Provider (ISP).

In another embodiment, the networking module is coupled to a Network Address Transfer (NAT) device which acquires a public Internet Protocol (IP) address from an Internet Service Provider (ISP) so that the networking module links the internet protocol device to the internet via the NAT device with the public IP address. The NAT device distributes a private IP address to the internet protocol device, the internet protocol device generates an internal service port number and notify the NAT device to create an external service port number, and a correlation among the public IP address, the external service port number, the private IP address and the internal service port number is recorded in the NAT device, wherein the public IP address and the external service port number constitute the updated network addressing information.

For example, the internet protocol device can be an IP camera, a network drive, a network printer or a network multimedia player or recorder; and the internet protocol device is accessible by user's node such as a personal computer or a network device with an IP address, which is capable of executing an application program to provide a user's interface for a user to enter the preset domain name of the internet protocol device.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed. The schematic drawings, not to scale, are employed to illustrate the specific features of the present invention.

Figure 2:
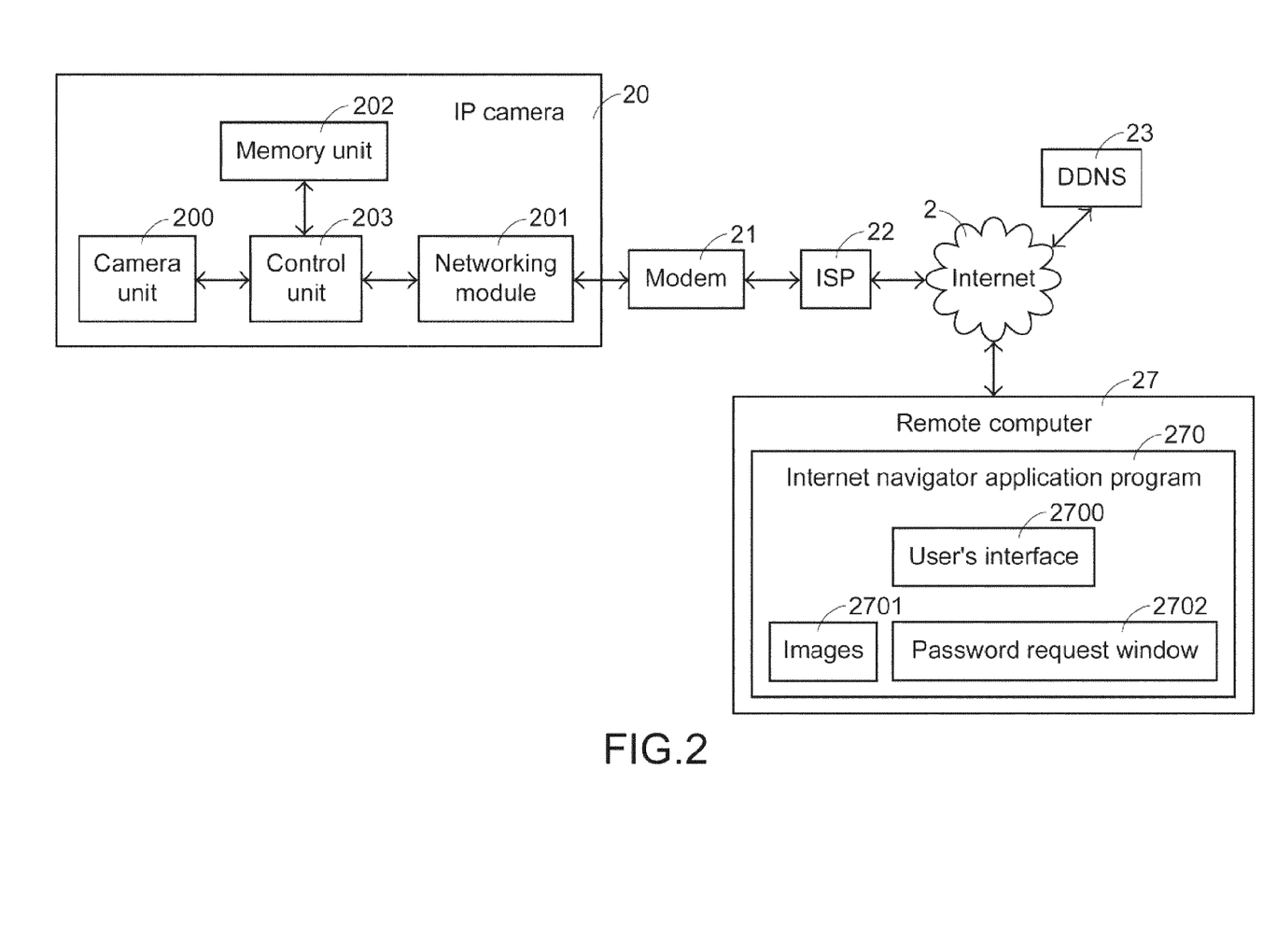
FIG. 2 is a structural block diagram illustrating a self-configured network system according to an embodiment of the present invention.

Please refer to FIG. 2. In a network system according to an embodiment of the present invention, an IP camera 20 is coupled to a modem 21 and capable of logging in an Internet Service Provider (ISP) 22 via the modem 21 to acquire an Internet Protocol (IP) address. The network system further includes a Dynamic Domain Name Server (DDNS) 23 coupled to Internet 2 for solving the problem encountered when the IP address is a dynamic IP address.

The IP camera 20 in this embodiment includes a networking module 201, a memory unit 202, a control unit 203 and a camera unit 200. While being produced, the IP camera 20 is given with an exclusive and non-reused serial number which is stored in the memory unit 202. Meanwhile, the DDNS 23 reserves a column recording therein a domain name and network addressing information corresponding to the serial number. For example, a serial number "00031B5A12F0" specific to the IP camera 20 is stored in the memory unit 202, and a corresponding domain name "00031B5A12F0.ipcam.alpha.com" is recorded in a correlation table associated with the IP camera 20 in the DDNS 23. Based on the correlation table, the column recording the network addressing information, e.g. IP address, of the domain name "00031B5A12F0.ipcam.alpha.com" can be located. In other words, after the IP camera 20 logs in the ISP 22 through the networking module 201 and the modem 21 and acquires the IP address, the control unit 203 of the IP camera 20 automatically transfers the IP address via the Internet 2 to the DDNS 23 to be stored in the column corresponding to the domain name "00031B5A12F0.ipcam.alpha.com". Afterwards, a remote computer 27 may execute an Internet navigator application program 270 which provides a user's interface 2700 for a user to enter the domain name "http://00031B5A12F0.ipcam.alpha.com:80", wherein "80" indicates a preset port number. Generally, the user would not particularly enter the port number since common Internet navigator application programs such as Internet Explorer (IE) do not require the input but automatically tag it to the IP address. Via the mapping operation of the DDNS 23, the entered domain name "http://00031B5A12F0.ipcam.alpha.com:80" corresponds to a column which indicates the IP address and further corresponds to the IP camera 20 pointed by the port "80" of the IP address.

In this way, a user is capable of view the images 2701 captured by the IP camera 20 from the remote computer 27.

According to the above embodiment, the IP camera 20 can be successfully located even if the IP address provided by the ISP 22 is floating. Whenever the IP camera 20 logs out and afterwards logs in again, it acquires a new IP address from the ISP 22. In response to the new IP address, the column corresponding to the domain name "00031B5A12F0.ipcam.alpha.com" in the DDNS 23 is updated to record the new IP address. Consequently, a user only needs to enter the same domain name "00031B5A12F0.ipcam.alpha.com" via the user's interface 2700, the floating IP address can still be located to reach the IP camera 20. For further facilitating the user to easily locate the IP camera, the serial number included in the domain name is preferably changeable. For example, the serial number "00031B5A12F0" can be edited into the user's name "Wilson" so that the IP camera can be located by entering "wilson.ipcam.alpha.com" via the user's interface 2700.

Furthermore, for security purpose, it is preferable to request a password for access to the IP camera. For example, when the IP camera 20 receives an access command from the remote computer 27, the control unit 203 of the IP camera 20 has the remote computer 27 show a password request window 2702 for the user to enter a password. The entered password is compared with the preset password stored in the memory unit 202. The image transmission from the IP camera 20 to the remote computer 27 cannot be conducted until the password is verified.

Figure 3:
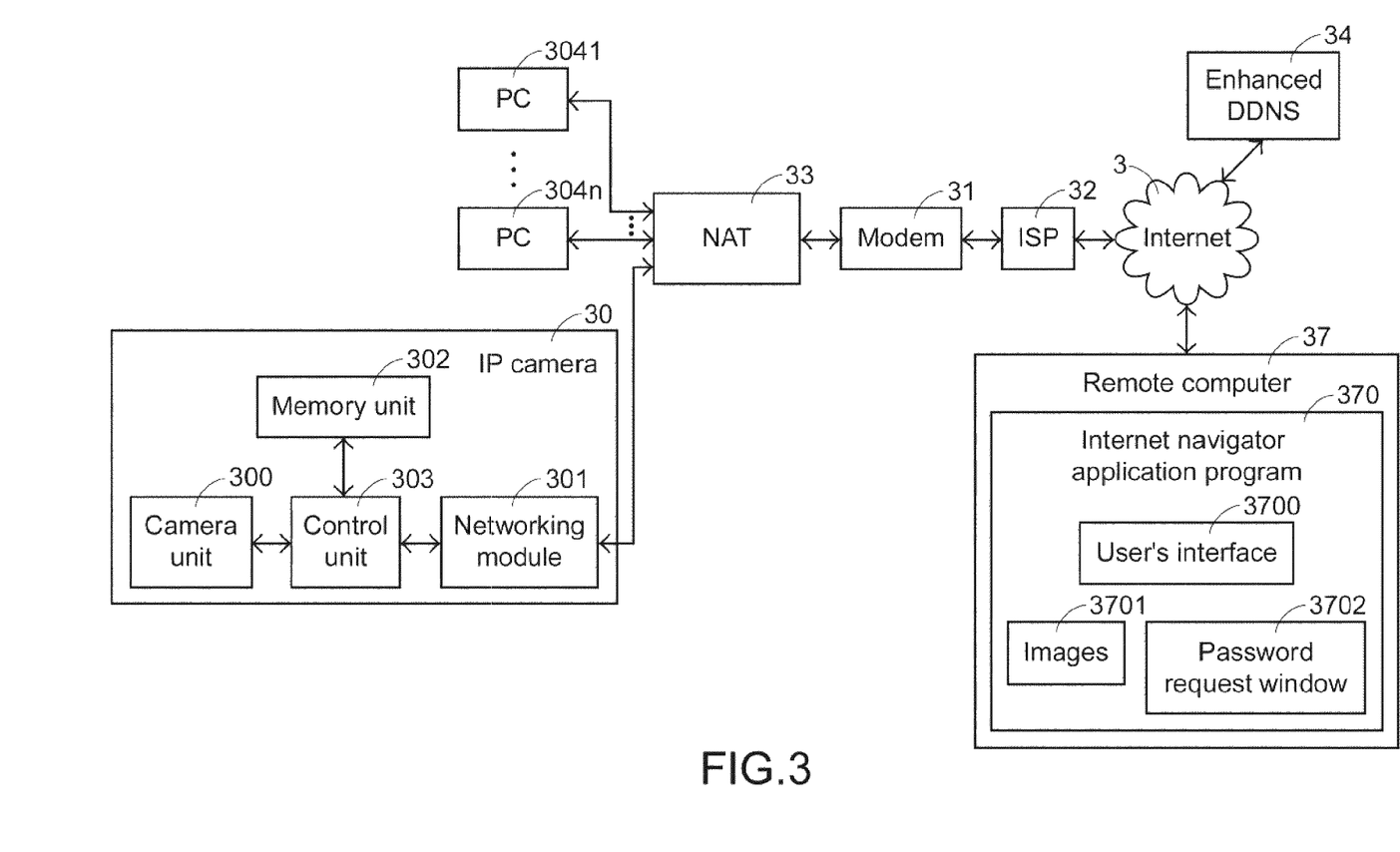
FIG. 3 is a structural block diagram illustrating a self-configured network system according to another embodiment of the present invention.

Please refer to FIG. 3 which illustrates another embodiment of network system according to the present invention. Nowadays, it is common that multiple computers 3041~304n access to Internet 3 at the same time by linking to an ISP 32 via the same modem 31 or alternative means such as T-1 lines, fiber optic lines or Wimax. Preferably but not necessarily, a Network Address Transfer (NAT) device 33 is used to perform the transfer between the local area network and the external network. For example, an IP sharer is one of the common NAT devices. First of all, the NAT device 33 acquires a public IP address from the ISP 32 via the modem 31. Then the NAT device 33 plays the role of Dynamic Host Configuration Protocol (DHCP) Server to dynamically distribute private IP addresses to the computers 3041~304n linking to the LAN ports. By way of the private IP addresses and the public IP address, the computers 3041~304n may share the same public IP address to access to the Internet 3.

In this embodiment, an IP camera 30 may link to the ISP 32 via the modem 31 like the computers 3041~304n. The IP camera 30 includes a networking module 301, a memory unit 302, a control unit 303 and a camera unit 300.

For acquiring the network addressing information of the IP camera 30, the NAT device 33 first acquires a public IP address from the ISP 32 via the modem 31. Then the networking module 301 of the IP camera, which has been connected to a LAN port of the NAT device 33, is assigned with an exclusive private IP address from the NAT device 33, and the IP camera 30 further generates an internal service port number and notifies the NAT device to create an external service port number. After the external service port number is granted by the NAT device 33, the NAT device 33 in communication with the control unit 303 records a correlation among the public IP address, the external service port number, the private IP address and the internal service port number. A service port number generally lies between 0 and 65535. Consequently, a remote computer 37 is capable of accessing to the IP camera 30 by connecting to the NAT device 33 indicated by the IP address incorporating therein the public IP address and the external service port number to catch the images from the IP camera 30.

For example, the NAT device 33 acquires a public IP address "203.128.0.1" from the ISP 32 via the modem 31, and the IP camera acquires a private IP address "192.168.1.1" from the NAT device 33 and generates an internal service port number "80". Afterwards, the IP camera notifies the NAT device of external service port creation and an external service port number is generated by the NAT device, e.g. as the number "8080". Provided that the NAT device 33 grants the external service port number as not being occupied, correlation of the private IP address and the internal service port number, e.g. "192.168.1.1:80" to the public IP address and the external service port number, e.g. "203.128.0.1:8080" is recorded in the NAT device 33. Afterwards, the control unit 303 automatically transfers the network addressing information incorporating therein the public IP address and the external service port number, e.g. "203.218.0.1:8080", to a particularly designed enhanced DDNS 34 coupled to the Internet 3. Similar to the embodiment of FIG. 2, the IP camera 30, while being produced, is assigned with an exclusive serial number which is stored in the memory unit 302 and corresponds to a domain name column included in the enhanced DDNS server 34. In the domain name column, corresponding IP address information and external service port number are recorded. For example, the serial number of the IP camera is "00031B5A12F0", and a corresponding domain name "00031B5A12F0.ipcam.alpha.com" is recorded in a correlation table associated with the IP camera 30 in the enhanced DDNS 34. Based on the correlation table, the column recording the combined IP address and external service port number, e.g. "203.218.0.1:8080", corresponding to the domain name "00031B5A12F0.ipcam.alpha.com" can be located.

Afterwards, when the remote computer 37 links to the Internet 3 in any way, it may execute an Internet navigator application program 370 which provides a user's interface 3700 for a user to enter the domain name "http://00031B5A12F0.ipcam.alpha.com:8080". Via the mapping operation of the enhanced DDNS 34, the entered domain name "http://00031B5A12F0.ipcam.alpha.com:8080" is directed to the column which indicates the public IP address and the external service port number of the IP camera 30, e.g. "203.218.0.1:8080". Accordingly, the remote computer 37 is able to connect to the NAT 33. Since the NAT 33 records therein the correlation among the public IP address, the external service port number, the private IP address and the internal service port number of the IP camera 30, the private IP address and internal service port number of the IP camera 30, e.g. "192.168.1.1:80", can be acquired according to the public IP address and the external service port number, e.g. "203.218.0.1:8080". In this way, a user is capable of view the images 3701 captured by the IP camera 30 from the remote computer 37.

According to the above embodiment, the IP camera 30 can be successfully located even if the IP address provided by the ISP 32 is floating. The IP camera 30 will automatically update the public IP address and the external service port number recorded in the column corresponding to the domain name "00031B5A12F0.ipcam.alpha.com" in the enhanced DDNS 34 to keep the network addressing information in the enhanced DDNS 34 always conform to the new network addressing information. Consequently, a user only needs to enter the same domain name "00031B5A12F0.ipcam.alpha.com" via the user's interface 3700, the floating IP address can still be located to reach the IP camera 30.

For further facilitating the user to easily locate the IP camera, the serial number included in the domain name is preferably changeable. For example, the serial number "00031B5A12F0" can be edited into the user's name "Wilson" so that the IP camera can be located by entering "wilson.ipcam.alpha.com" via the user's interface 3700.

In the above embodiment, the NAT device 33 serves as a DHCP server to dynamically distribute private IP addresses to the devices linking to the LAN ports. Alternatively, the NAT device 33 does not have to exhibit the function of a DHCP server but the present invention can still work as long as one of the computer hosts in the local area network has the same network segment as the NAT device 33 and is capable of providing the DHCP service to distribute the private IP addresses. Even if there is no such host or server in the local area network, the private IP address and the internal service port number of the IP camera 30 can still be self-configured. For example, a user may manually modify the preset IP address of the IP camera 30 to have the IP camera 30 have the same network segment as the NAT 33. Then the control unit 303 of the IP camera 30 actively acquires the network configuration of the NAT 33 for self-configuring the private IP address and the internal service port number by way of a Universal Plug and Play (UPnP) protocol. Afterwards, the correlation among the public IP address, the external service port number, the private IP address and the internal service port number can be automatically established as described above.

Since common network navigator application programs such as Internet Explorer preset the service port number included in the IP address as for example "80", the input "http://00031B5A12F0.ipcam.alpha.com" via the IE interface will be automatically changed into and outputted as "http://00031B5A12F0.ipcam.alpha.com:80" by the navigator, which results in failure in successfully locating the IP address and the service port number other than 80, e.g. "8080". For solving this problem, a redirecting function is added to the enhanced DDNS according to the present invention to redirect the IP address and service port number. For example, in response to the domain name "http://00031B5A12F0.ipcam.alpha.com:80", it is determined that the domain name is entered for executing the present service, so a redirecting operation is performed. The redirecting operation includes obtaining the network addressing information as for example "203.218.0.1:8080", and substituting the preset value "80" with the external service port number "8080", thereby solving the above-mentioned problem encounter by the IE navigator.

In a further embodiment, the remote computer may execute an application program to provide an interface for a user to enter the serial number of the IP camera, e.g. 00031B5A12F0, and then automatically generate the preset domain name, e.g. "http://00031B5A12F0.ipcam.alpha.com:8080". According to the correlation table recorded in the enhanced DDNS, the network addressing information, e.g. "203.218.0.1:8080", representing the IP camera can be acquired. In this way, the IP camera can be accessed by the remote computer without the additional redirecting operation.

Furthermore, for security purpose, it is preferable to request a password for access to the IP camera. For example, when the IP camera 30 receives an access command from the remote computer 37, the control unit 303 of the IP camera 30 has the remote computer 37 show a password request window 3702 for the user to enter a password. The entered password is compared with the preset password stored in the memory unit 302. The image transmission from the IP camera 20 to the remote computer 37 cannot be conducted until the password is verified.

According to the present invention, the IP camera, even if it has a dynamic IP address or share an IP address with other internet protocol devices, can be successfully located by a remote computer by simply entering information including the serial number or specific name of the IP camera via an application program executed on the remote computer. The application program is able to automatically link to the DDNS or enhanced DDNS to acquire the correct and updated IP address and/or service port number of the IP camera.

Figure 4:
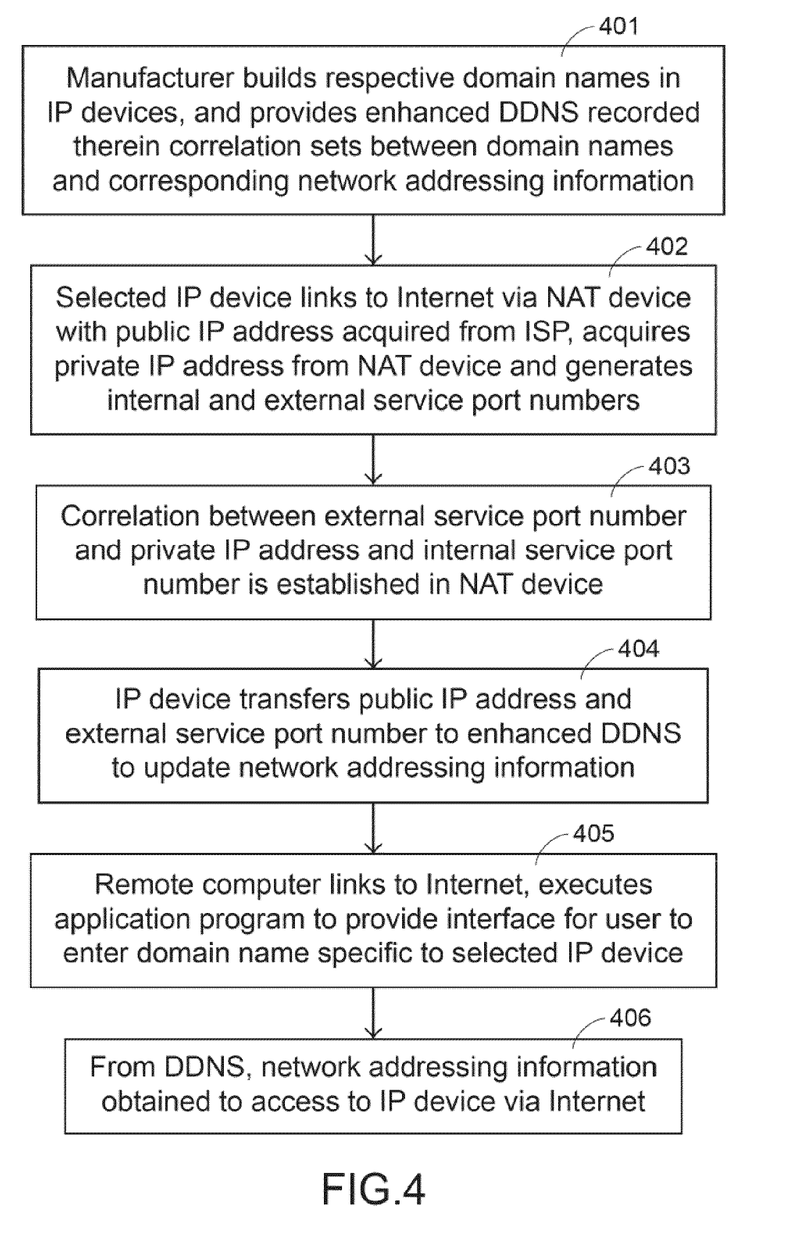
FIG. 4 is a flowchart illustrating a self-configuration method of a network system according to an embodiment of the present invention.

An embodiment of the self-configuration method according to the present invention for allowing a user's node to access an IP device via an internet is summarized with reference the flowchart of FIG. 4. First of all, the manufacturer provides an enhanced DDNS in communication with Internet and builds preset domain names in a plurality of IP devices, respectively, wherein the enhanced DDNS is recorded therein a plurality of correlation sets between the preset domain names of the IP devices and corresponding network addressing information (Step 401). After one of the IP devices links to Internet via a NAT device with a public IP address acquired from an ISP and the IP device automatically acquires an exclusive private IP address from the NAT device and generates an internal service port number and a granted external service port number (Step 402), a correlation between the external service port number and the private IP address and internal service port number is established in the NAT device (Step 403). The IP device then automatically transfers the public IP address and the external service port number to the enhanced DDNS to update the network addressing information corresponding to the preset domain name of the IP device (Step 404). Afterwards, when a remote computer is to access to the IP device, the remote computer executes an application program to provide an interface for a user to enter the domain name specific to the IP device (Step 405). From the DDNS, the network addressing information corresponding to the entered domain name can be located so as to be able to access to the IP device via Internet (Step 406).

It is understood from the above descriptions that according to the present invention, an IP device may share a public IP address of the NAT device with other IP devices. Furthermore, all the installation is self-configured without applying for a user's account in advance or complicated manual setting to share the public IP address. Even if the external service port number, e.g. "8080" as exemplified above, is denied by the NAT device due to occupation, the IP device will generate another external service port number and request for confirmation again until one is successfully confirmed. In this way, a conflict problem possibly encountered when a plurality of IP devices share the same NAT device can be solved. It is to be noted that in addition to IP cameras, other suitable IP devices, e.g. network drives or file servers, network printers, network multimedia players or recorders, etc., can also be self-configured according to the present invention. On the other hand, the remote computer can be replaced by another suitable network device such as a mobile phone, a personal digital assistant (PDA), a digital photo frame, etc., which is able to acquire an IP address and provide a user's interface.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A self-configured network system, comprising:
a server configured for linking to a network and including a plurality of columns, each of which records therein correlation of a domain name to a corresponding network addressing information;
an internet protocol device having a serial number and built therein a preset domain name which incorporates said a serial number, and acquiring an updated network addressing information in the network, wherein the preset domain name is previously recorded in a specified column of the server, and the internet protocol device transfers the preset domain name and the updated network addressing information to the server via the network so as to locate the specified column and write the updated network addressing information as the corresponding network addressing information; and
a user's node configured for linking to the network and accessible to the server to acquire the updated network addressing information of the internet protocol device via the network in response to input of the preset domain name;
wherein the server reserves a column recording therein a domain name of the internet protocol device and network addressing information specifically corresponding to the serial number of the internet protocol device.

2. The self-configured network system according to claim 1 wherein the updated network addressing information is an updated Internet Protocol (IP) address and the internet protocol device acquires the updated network addressing information from an Internet Service Provider (ISP), and wherein the server is a Dynamic Domain Name Server (DDNS) installed therein a domain-name—IP-address correlation table including the specified column recording therein the preset domain name and the updated IP address.

3. The self-configured network system according to claim 1 further comprising a Network Address Transfer (NAT) device acquiring a public Internet Protocol (IP) address from an Internet Service Provider (ISP) so that the internet protocol device links to Internet via the NAT device with the public IP address, wherein the internet protocol device dynamically acquires a private IP address from the NAT device and generates an internal service port number specific thereto.

4. The self-configured network system according to claim 3 wherein the server is an enhanced Dynamic Domain Name Server (enhanced DDNS) installed therein a domain-name—network addressing information correlation table including the specified column recording therein the preset domain name and the updated network addressing information.

5. The self-configured network system according to claim 4 wherein the network addressing information recorded in the domain-name—network-addressing-information correlation table incorporates therein the public IP address and an external service port number, wherein the external service port number is generated by the NAT device and notified of port creation by the internet protocol device and a correlation among the public IP address, external service port number, private IP address and internal service port number is recorded in the NAT device.

6. The self-configured network system according to claim 1 wherein the internet protocol device is selected from a group consisting of an IP camera, a network drive, a network printer and a network multimedia player or recorder.

7. The self-configured network system according to claim 1 wherein the user's node is selected from a group consisting of a personal computer and a network device with an IP address, which is configured for executing an application program to provide a user's interface for a user to enter the preset domain name of the internet protocol device.

8. A self-configuration method of a network system for allowing a user's node to access an internet protocol device via a network, the self-configuration method comprising:
providing a preset domain name which incorporates an uniquely assigned serial number assigned to and stored within the internet protocol device, built in the internet protocol device for the internet protocol device to acquire an updated network addressing information in the network;
providing a correlation table built in a server, the correlation table including a plurality of columns, each of which records therein correlation of a domain name to a corresponding network addressing information and a specified one of which stores the preset domain name and a preset network addressing information corresponding to the preset domain name; and
linking the internet protocol device to the network and transferring the preset domain name and the updated network addressing information from the internet protocol device to the server via the network so as to locate the specified column and write the updated network addressing information as the preset network addressing information;
wherein after linking to the network, the user's node accesses to the server to acquire the updated network addressing information of the internet protocol device via the network in response to input of the preset domain name so as to link to the internet protocol device according to the updated network information, the server reserves a column recording therein a domain name of the internet protocol device and network addressing information specifically corresponding to the serial number of the internet protocol device.

9. The method according to claim 8 wherein the updated network addressing information is an Internet Protocol (IP) address and the internet protocol device acquires the updated network addressing information from an Internet Service Provider (ISP).

10. The method according to claim 8 further comprising:
connecting the internet protocol device to a Network Address Transfer (NAT) device which acquires a public Internet Protocol (IP) address from an Internet Service Provider (ISP) so that the internet protocol device links to Internet via the NAT device with the public IP address;
dynamically distributing a private IP address from the NAT device to the internet protocol device;
generating an internal service port number and notifying the NAT device of an external service port number creation by the internet protocol device;
generating an external service port number by the NAT device;
recording a correlation among the public IP address, the external service port number, the private IP address and the internal service port number in the NAT device; and
recording a network addressing information incorporating therein the public IP address and the external service port number in the specified column of the server as the updated network addressing information.

11. The self-configured network system according to claim 8 wherein the server is a Dynamic Domain Name Server (DDNS) or an enhanced DDNS installed therein the correlation table which is a domain-name—network addressing information correlation table including the specified column recording the preset domain name and the updated network addressing information.

12. An internet protocol device accessible by a user's node via an a network, the internet protocol device comprising:
   a memory unit storing therein a preset domain name specific to the internet protocol device where said present domain name incorporates an uniquely assigned serial number assigned to and stored within the internet protocol device;
   a networking module linking the internet protocol device to the network, acquiring an updated network addressing information in the network according to the preset domain name; and
   a control unit coupled to the memory unit and the networking module and transferring the preset domain name and the updated network addressing information to a server via the network so as to locate a specified column corresponding to the preset domain name in the server and write the updated network addressing information into the specified column;
   wherein after linking to the network, the user's node accesses the server to acquire the updated network addressing information of the internet protocol device via the network in response to input of the preset domain name so as to link to the internet protocol device according to the updated network information, and the server reserves a column recording therein a domain name of the internet protocol device and network addressing information specifically corresponding to the serial number of the internet protocol device.

13. The internet protocol device according to claim 12 wherein the updated network addressing information is an updated Internet Protocol (IP) address and the internet protocol device acquires the updated network addressing information from an Internet Service Provider (ISP), and wherein the server is a Dynamic Domain Name Server (DDNS) installed therein a domain-name—IP-address correlation table including the specified column recording therein the preset domain name and the updated IP address.

14. The internet protocol device according to claim 12 wherein the networking module is coupled to a Network Address Transfer (NAT) device which acquires a public Internet Protocol (IP) address from an Internet Service Provider (ISP) so that the networking module links the internet protocol device to Internet via the NAT device with the public IP address.

15. The internet protocol device according to claim 14 wherein the NAT device distributes a private IP address to the internet protocol device, the internet protocol device generates an internal service port number and notifies the NAT device to create an external service port number, and a correlation among the public IP address, the external service port number, the private IP address and the internal service port number is recorded in the NAT device, wherein the public IP address and the external service port number constitute the updated network addressing information.

16. The internet protocol device according to claim 15 wherein the server is an enhanced Dynamic Domain Name Server (enhanced DDNS) installed therein a domain-name—network-addressing-information correlation table including the specified column recording therein the preset domain name and the updated network addressing information.

17. The internet protocol device according to claim 12 being selected from a group consisting of an IP camera, a network drive, a network printer and a network multimedia player or recorder.

18. The internet protocol device according to claim 12 being accessible by the user's node which is selected from a group consisting of a personal computer and a network device with an IP address, which is configured for executing an application program to provide a user's interface for a user to enter the preset domain name of the internet protocol device.

* * * * *